Oct. 7, 1924.　　　　　　　　　　　　　　　　　1,510,820
P. BERDAR
VALVE
Filed March 2, 1923
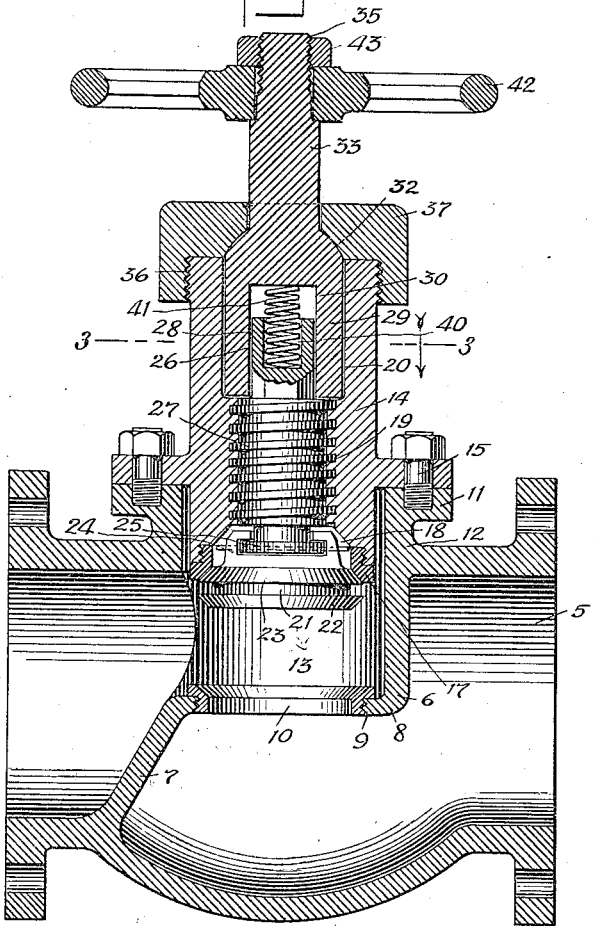
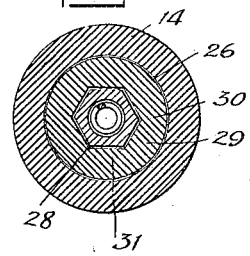
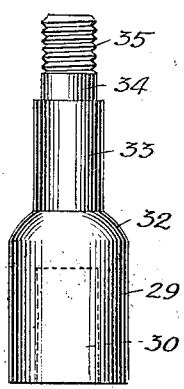
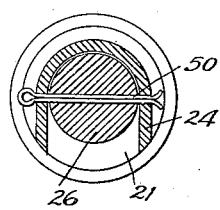
WITNESSES
INVENTOR
PETER BERDAR
BY
ATTORNEYS Patented Oct. 7, 1924.

1,510,820

UNITED STATES PATENT OFFICE.

PETER BERDAR, OF NEW YORK, N. Y.

VALVE.

Application filed March 2, 1923. Serial No. 622,389.

*To all whom it may concern:*

Be it known that I, PETER BERDAR, a citizen of the United States, and a resident of the city of New York, Richmond Hill, borough of Queens, in the county of Queens and State of New York, have invented a new and Improved Valve, of which the following is a full, clear, and exact description.

The present invention relates to new and useful improvements in reciprocating valves, and it pertains more particularly to valves especially adapted for use in connection with pipe lines wherein steam, water, and the like, are handled under pressure.

It is one of the objects of the invention to provide a valve in which various parts of the valve-operating mechanism are readily accessible for the purpose of repair or renewal.

It is a further object of the invention to provide a valve whereby the several parts of the operating mechanism may be removed or repaired without necessitating a shutting down of the pipe line in which the valve is mounted.

It is a still further object of the invention to provide a valve in which the valve member engages two seats, one of the seats being employed to shut off the pipe line when the valve engages the same, the other seat being employed to render the valve leakproof when the valve is in its open position.

With the above and other objects in view, reference is had to the accompanying drawings, in which—

Figure 1 is a vertical sectional view of a valve constructed in accordance with the present invention;

Fig. 2 is a detail view in elevation of a portion of the valve-operating mechanism;

Fig. 3 is a detail sectional view taken on the line 3—3 of Fig. 1;

Fig. 4 is a detail sectional view showing the manner in which the valve element is secured to the valve stem.

Referring more particularly to the drawings, the valve comprises a body 5, and said body is formed with a partition having vertical walls 6 and 7 connected by a horizontal wall 8, which wall extends parallel with the axis of the valve body. The wall 8 is provided with an opening 9, and mounted in the opening 9 is a removable valve seat 10. The valve body is provided with a flange 11, and said flange is formed on the top face of a neck 12 on the body to provide a valve chamber or passage 13. Carried by the flange 11 is a housing member 14, said housing member being secured to the flange 11 by means of bolts or the like, 15. This housing member is provided on its lower end with a removable valve seat 17, which valve seat is provided in a chamber 18. Extending from the chamber 18 is a screw-threaded passage 19, and said screw-threaded passage terminates in an upper enlarged portion 20. The removable seats (10) and (17) are duplicates and both removable upon removing the housing member.

The reference character 21 designates the valve element and said valve element has two valves faces 22 and 23. The valve element 21 is provided with a yoke or the like, 24, and said yoke is adapted to receive a head 25 provided on the lower end of a valve stem 26. This valve stem 26 is screw-threaded as at 27, for engagement with the internal screw threads of the member 14 in order that as the valve stem is rotated the same will be reciprocated through the member 14. The upper end of the valve stem is hexagonal as at 28, by means of which the valve stem is rotated.

Fitting in the enlarged portion 20 of the member 14, is a key member 29, and said key member has a chamber 30 adapted to receive the valve stem 26, which chamber is hexagonal in cross sectional form as at 31 for engagement with the hexagonal valve stem in such a manner that as the member 29 is rotated the valve stem will be likewise rotated within the chamber 14. The upper portion of the hollow section of the key member 29 is curved as designated by the reference character 32 forming a shoulder, and projecting from this portion is a reduced portion 33, projecting from which is a still further reduced portion 34 having a screw-threaded section 35.

The upper end of the member 14 is screw-threaded as indicated by the reference character 36, and having engagement therewith is a bonnet or the like, 37. This bonnet 37 is provided with a curved seat adapted to receive the curved face 32 of the key member 29 as shown.

The reference character 42 designates a hand wheel which is secured to the reduced portion 34 by means of a nut 43.

The upper end of the reduced portion 33 is provided with a recess 40 within which a spring 41 is adapted to seat. The upper end of this spring engages the top wall of the recess or cut-out portion 30 in the member 29, as shown in Fig. 1.

Referring again to the valve member 21 and the head 25 of the stem 26, it will be apparent by reference to Fig. 4, that a cotter pin or similar fastening 50 is employed for preventing accidental displacement of the valve element relative to the stem 26. This cotter pin 50 extends through the yoke 24 of the valve member and the head 25 of the valve stem 26.

The device operates in the following manner:

When the valve is in the open position as shown in Fig. 1, the valve face 23 is engaged with the valve seat 17 and this prevents escape of steam, water, or other material which may be passing through the valve body 5, around the valve stem and its operating mechanism. When the valve is closed, however, the face 22 of the valve element engages the seat 10.

When it is desired to renew or repair any of the parts of the operating mechanism, it is only necessary to cause an engagement of the face 23 with the valve seat 17, after which the bonnet 37 may be removed, the operating member 29 may be removed, and the hand wheel 42 or spring 41, or both, may be removed, without shutting down the line in which the valve is employed, since the valve member 21 being in engagement with the seat 17 prevents escape of steam or the like around the stem.

From the foregoing it is apparent that the present invention provides a valve in which the several elements of the operating mechanism may be removed without necessitating the shutting down of the line in connection with which the valve is used.

Another advantage of the valve disclosed in this application is the fact that the spring 41 is mounted outside the bonnet and that by this construction said spring is always accessible for inspection and may be removed without taking down the valve.

A still further advantage lies in the fact that due to the curved face 32 engaging the seat 38 of the bonnet 37, a further seal is provided which serves to prevent accidental leakage of steam or the like around the operating member 29 of the valve.

What is claimed is:

A valve comprising a hollow body with a partition therein, a valve seat in the partition, a valve supporting member secured to and projecting into the body and having an opposing seat spaced from the first seat, a valve stem threaded through the supporting member and carrying a double-faced valve at its end between the seats adapted to engage either seat upon turning the stem, a polygonal extension from the stem having an axial recess, a stem operating device rotatably extending into the supporting member and having a polygonal recess slidably receiving the extension, a curved shoulder on the stem operating device, a bonnet securing the operating device to the supporting member and having a curved seat receiving the curved shoulder, and a spiral spring seated within the axial recess and reacting against the end of the polygonal recess in the operating device for forcing the shoulder of the operating device against the curved seat.

PETER BERDAR.